US006280370B1

(12) United States Patent
Falkenhagen

(10) Patent No.: US 6,280,370 B1
(45) Date of Patent: Aug. 28, 2001

(54) ABRASION RESISTANT SURFACE COATINGS AND METHOD OF FORMING SAME

(75) Inventor: Timothy Stuart Falkenhagen, Stretton (AU)

(73) Assignee: The Track Shop Pty Ltd., Gatton (AU)

( * ) Notice: Subject to any disclaimer, the term of this patent is extended or adjusted under 35 U.S.C. 154(b) by 0 days.

(21) Appl. No.: 09/367,207

(22) PCT Filed: Feb. 10, 1998

(86) PCT No.: PCT/AU98/00074

§ 371 Date: Aug. 9, 1999

§ 102(e) Date: Aug. 9, 1999

(87) PCT Pub. No.: WO98/34729

PCT Pub. Date: Aug. 13, 1998

(30) Foreign Application Priority Data

Feb. 10, 1997 (AU) .................................................. P05047
Apr. 30, 1997 (AU) .................................................. P06499

(51) Int. Cl.[7] .................................................. B23P 15/00

(52) U.S. Cl. .................................. 492/33; 492/49; 492/54; 241/293; 29/895.32

(58) Field of Search .................................. 492/30, 33, 54, 492/49; 29/895.3, 557, 895.31, 895.32; 241/293

(56) References Cited

U.S. PATENT DOCUMENTS 1,605,049 * 11/1926 Maxwell .
4,380,852 * 4/1983 Leschinsky et al. .
4,391,026 7/1983 Casey .
4,391,768 * 7/1983 Arends et al. .
4,561,156 * 12/1985 Sun .
4,989,305 * 2/1991 Pole et al. .
5,165,613 * 11/1992 Keller .

FOREIGN PATENT DOCUMENTS 2025260 1/1980 (GB) .

* cited by examiner

*Primary Examiner*—I Cuda Rosenbaum
(74) *Attorney, Agent, or Firm*—Abelman, Frayne & Schwab

(57) ABSTRACT

Hardfacing for a sugar mill roller is disclosed including a wear resistant material supported by a mild steel matrix and applied to the outer surface of the sugar mill roller. A method of hardfacing a sugar mill roller is also disclosed wherein a mild steel weld pool is formed on the surface of the roller, a particulate wear resistant material is impinged on the weld pool, and the weld pool is allowed to solidify. A method of applying a hardfacing capping to a ridge profile of a sugar mill roller is also disclosed, wherein hardfacing composition comprising a mild steel matrix material is progressively laid up by welding and a particulate abrasion resistant material is continuously impinged thereon. Preferably, the ridge profile includes a base portion and one or more elongate projections extending away from the base portion, and one or more beads of hardfacing composition are applied to the base portion against the sides of the or each projection in successive layers until the height of the or each projection is substantially reached. It is further preferred that at least one further bead of hardfacing composite is applied to the or each respective projection to substantially encapsulate the same.

9 Claims, 9 Drawing Sheets

ABRASION RESISTANT SURFACE COATINGS AND METHOD OF FORMING SAME

TECHNICAL FIELD

This invention relates to mill rollers and abrasion resistant surface coatings for mill rollers, as well as methods of constructing mill rollers and forming abrasion resistant surface coatings on mill rollers.

The invention has particular application to sugar mill rollers and for illustrative purposes, reference will be made to such application. However, it is to be understood that the invention may have use in other applications where improved mill rollers are required.

BACKGROUND ART

In the sugar industry, sugar cane is typically crushed between rollers arranged in pairs or in groups of three. Generally, the rollers have a plurality of machined ridges extending circumferentially about the roller forming a surface of alternate ridges and valleys. The grooves are typically evenly spaced along the roller, however, it will be appreciated that in some applications, it may be desirable to have unevenly spaced grooves. The grooved arrangement provides for gripping of the sugar cane fibre as it passes between the rollers, the groove of an upper roller being operatively aligned with the ridges of its opposing lower roller or rollers.

A sugar mill roller is usually constructed as a cast roller mounted on a shaft and turned by drive means. Wear resistant material has on occasion been provided on the caps of the ridges of grooved rollers, but only at intermittent locations around the circumference of the roller. This approach has been taken partly because it was believed that the intermittent application of the abrasion resistant material produced the best gripping surface for the milling of sugar cane. Typically, conventional hardfacing material is used, including, for example, high speed steels, austenitic manganese steels, austenitic high chromium irons, cobalt or copper based alloys, or nickel-chromium-boron alloys according to the practices set forth in Jones, F D, & Horton, H L, *Machinery's Handbook*, ISBN 0-8311-1155-0. Additionally, abrasion resistant material such as chips of tungsten carbide, for example, may be laid up in the matrix to form a hardfacing composite in the hardfacing materials listed in this reference or in mild or stainless steel weld.

After a period of use, sugar mill rollers require refurbishment due to the hardfacing wearing smooth, causing slippage of the cane and/or bagasse between the rollers. In order to refurbish such a roller according to traditional practice the entire roller is removed from the mill, broken up and recast into a new roller. This approach is costly in terms of replacing the entire roller and requires a significant downtime for the sugar mill in having the roller replaced. There are also costs for heavy transport for removing and delivering the rollers to site.

The present invention aims to alleviate one or more of the above disadvantages and to provide a roller having a wear resistant surface and method of forming same which will be reliable and efficient in use.

DISCLOSURE OF INVENTION

With the foregoing in view, this invention in one aspect resides broadly in a sugar mill roller including:

a roller body of substantially circular cross-section having a plurality of circumferentially running machined ridges formed to be substantially parallel and spaced along a substantial part of said roller body, each said machined ridge including one or more land portions, and a ridge capping on said one or more land portions, each said ridge capping including a plurality of layers of weld supporting therein a wear resistant material.

Preferably, each machined ridge includes two or a multiple of two land portions, separated by a wall portion and one or more of the layers of weld are supported on respective ones of the land portions against the wall portion. It is also preferred that the roller body be formed of grey cast iron, and the ridge capping includes a first layer of stainless steel weld, and further preferred that the first layer includes no wear resistant material.

In another aspect, this invention resides broadly in a method of applying hardfacing to a sugar mill roller, the method including:

providing a roller body of substantially circular cross-section;

machining a plurality of circumferentially running ridges on said roller body, said ridges being substantially parallel and axially spaced along a substantial part of said roller body, each said ridge including one or more land portions, and on each said ridge, forming a weld matrix on the or each innermost land portion by successively applying weld on the previous layer until a ridge capping of desired profile is formed substantially all the way round said roller body, at least some of said layers of weld having particulate wear resistant material supported therein.

Preferably, a wall portion is machined on each ridge so as to provide one or more land portions on each side of the wall portion, and weld is applied against each side of the wall portion in successive layers until the height of the wall portion is substantially reached. One or more further layers of weld are preferably applied to each respective ridge to substantially encapsulate the wall portion.

The weld may be applied by any suitable welding process, however metal inert gas (mig) welding or tungsten inert gas (tig) welding is used, and the weld pool first applied to the or each said land portion is formed from a stainless steel welding rod without any wear resistant material added thereto and successive layers are formed from a mild steel welding rod used in which respective successive weld pools are impinged with a particulate wear resistant material. The layers are laid up until a ridge capping of desired profile is formed substantially all the way round each ridge.

In another aspect, this invention resides broadly in a sugar mill roller including a roller body formed in accordance with the method as hereinbefore described. However, it will be appreciated that the hardfacing may be applied to substrates other than sugar mill rollers.

In another aspect, this invention resides broadly in a roller assembly including:

a mounting shaft;

a plurality of shell portions, each said shell portion being mountable to said mounting shaft and shaped for abutment together to form a roller cap;

each said shell portion having an outer perimeter and an inner diameter of a dimension permitting tight engagement of said roller cap onto said mounting shaft, and a wear resistant surface applied to the outer perimeter.

The roller caps may have a substantially smooth outer surface for receiving the hardfacing, but preferably, the roller caps include a plurality of grooves extending circumferentially about the outer perimeter as hereinbefore described. The roller assembly is preferably circular in section, although it will be appreciated that other sections may be utilised, such as elliptical or dog-bone interengageable sections.

The wear resistant surface is preferably in the form of a wear resistant weld applied to the outer perimeter as hereinbefore described. Preferably, at least some of the ridges between the grooves include a cap portion with an abrasion resistant material on each cap portion.

The roller cap may include shell portions connectible to form an annular shell element, or be comprised of a unitary annular shell element, each shell element being abuttable to form the roller assembly such as for example, a sugar mill roller.

In sugar milling applications, the groove profile is selected to be similar in size and shape of cross-section to the groove profile of cast sugar mill rollers, that is generally between 15 mm and 80 mm pitch, but more commonly, either 25 mm, 37.5 mm or 50 mm pitch.

Preferably, the groove profile includes a ridge profile which includes an elongate projection and a land area on each side of the elongate projection such that successive layers of weld may be applied sequentially, allowing sufficient time between the respective layers for cooling of the weld. Suitably, the first layer of weld on each side of the projection is applied to the respective land areas. The elongate projection is of a suitable thickness to perform as a dam preventing the weld from falling onto the other land area. The combination of application of weld layers is adapted to produce a weld profile which when solidified is of substantially triangular cross-section.

The combination of welding torch angle, pre-machined roller tooth profile, rotational speed of the roller (weld surface speed), raw materials, preheat & specific welding consumables provides the finished profile for a sugar mill roller to be used in an as-welded condition. This is preferably done whilst the roller is rotated with its longitudinal axis in the horizontal plane.

In another aspect, this invention resides broadly in a method of applying a hardfacing composite to a sugar roller, said method including rolling said roller at a circumferential speed suitable for the application of the hardfacing composite whereby said hardfacing composite is applied continuously around the entire circumference of said roller. Preferably, a plurality of beads of hardfacing composite are applied about the roller. It is also preferred that the beads of hardfacing be applied in parallel relationship along the distal edge portions of the ridges normally provided on sugar mill rollers. The roller preferably includes shell portions as hereinbefore defined.

The shell portions may be formed by machined solid metal, such as steel, rolling or casting. Where the shell portion is formed by rolling, the hardfacing composite may be applied before or after the forming.

Preferably, the wear resistant hardfacing is made by using ARM-2 weld as manufactured and supplied by Abrasion Resistant Materials Pty Ltd, at a suitable current, typically 200 to 260 amps, and a suitable potential, typically 22 to 26 volts in a mig atmosphere at a linear rate sufficient to coat the required net area required for the weld. This wire conforms to BS2901 Part 1 1970A18 and AWS A5.18 E70S-6.

The grit may be added into the molten weld pool during the welding process, by any suitable means, and is preferably to mesh size 12/35.

It has been surprisingly found that abrasion resistant hardfacing material provided as described above provides a superior gripping surface for sugar cane milling. Moreover, the grip improves with use, and this is believed to be due at least in part to the acidic juices preferentially eroding away part of the matrix and providing a more pronounced profile of the hard tungsten carbide particles which grip onto the fibre mat upon contact. There is also believed to be a contribution to the erosion from frictional wear of the bagasse on the matrix.

In a further preferred form suitable for use as a sugar mill cane crushing roller, the roller cap includes fixing means for fixing to the mounting shaft. For example, where the roller cap is in the form of arcuate segments, pairs of semi-circular sectional pieces or triplets each having segments with internal radii at 120°, and so forth may be provided. The segments are abuttable to form a roller end cap which is removable and replaceable on the mounting shaft to form the sugar cane roller. The mounting shaft is adapted suitably to receive the segments by provision of complementary fixing means operatively engagable with the fixing means on the respective segments.

The fixing means may for example include one or more flange portions disposed circumferentially about the internal arc of circumference and at each respective end of each roller cap. Each flange portion may further include an aperture extending therethrough in a coaxial direction and through which fastening means, such as a bolt, screw or such like may be passed to fasten the roller cap to the mounting shaft through corresponding apertures on the mounting shaft.

Preferably, however, a sleeve with a flattened portion extending axially along its entire length is provided, the sleeve being adapted to fit on the shaft and receive the hard-faced shells which include a complementary internal land on their respective internal bores. The roller end caps are fixed, such as by bolting, onto the ends of the sleeve.

In another aspect, this invention resides broadly in a method of forming a roller assembly including:

providing a mounting shaft;

forming a plurality of shell portions;

mounting each said shell portion to said mounting shaft in abutting relationship to form a roller cap, and applying a wear resistant surface to the outer perimeter of at least some of the shell portions.

Preferably, the wear resistant surface is applied to the shell portions prior to mounting on the mounting shaft. The shell portions may be raised in temperature relative to the temperature of the mounting shaft in order to provide tight engagement of the shell portions on the mounting shaft. For example, the shell portions may include an inner diameter of a dimension permitting tight engagement of the shell portion onto the mounting shaft by heating each said shell portion to a temperature sufficient to expand said shell for engagement about the shaft, whereby a plurality of said shells may be abutted along the shaft.

Where the shell portions are provided in arcuate portions, they are suitably connected circumferentially to form respective annular shells. In a preferred embodiment, each said shell portion includes a plurality of grooves extending circumferentially about the respective outer perimeter as hereinbefore described.

In another aspect, this invention resides broadly in a hardfacing for a sugar mill roller, said hardfacing including a wear resistant material supported by a mild steel matrix and applied to the outer surface of a sugar mill roller.

BEST MODE FOR CARRYING OUT THE INVENTION

In order that this invention may be more readily understood and put into practical effect, reference will now be made to the accompanying drawings which illustrate a preferred embodiment of the invention and wherein.

Figure 1:
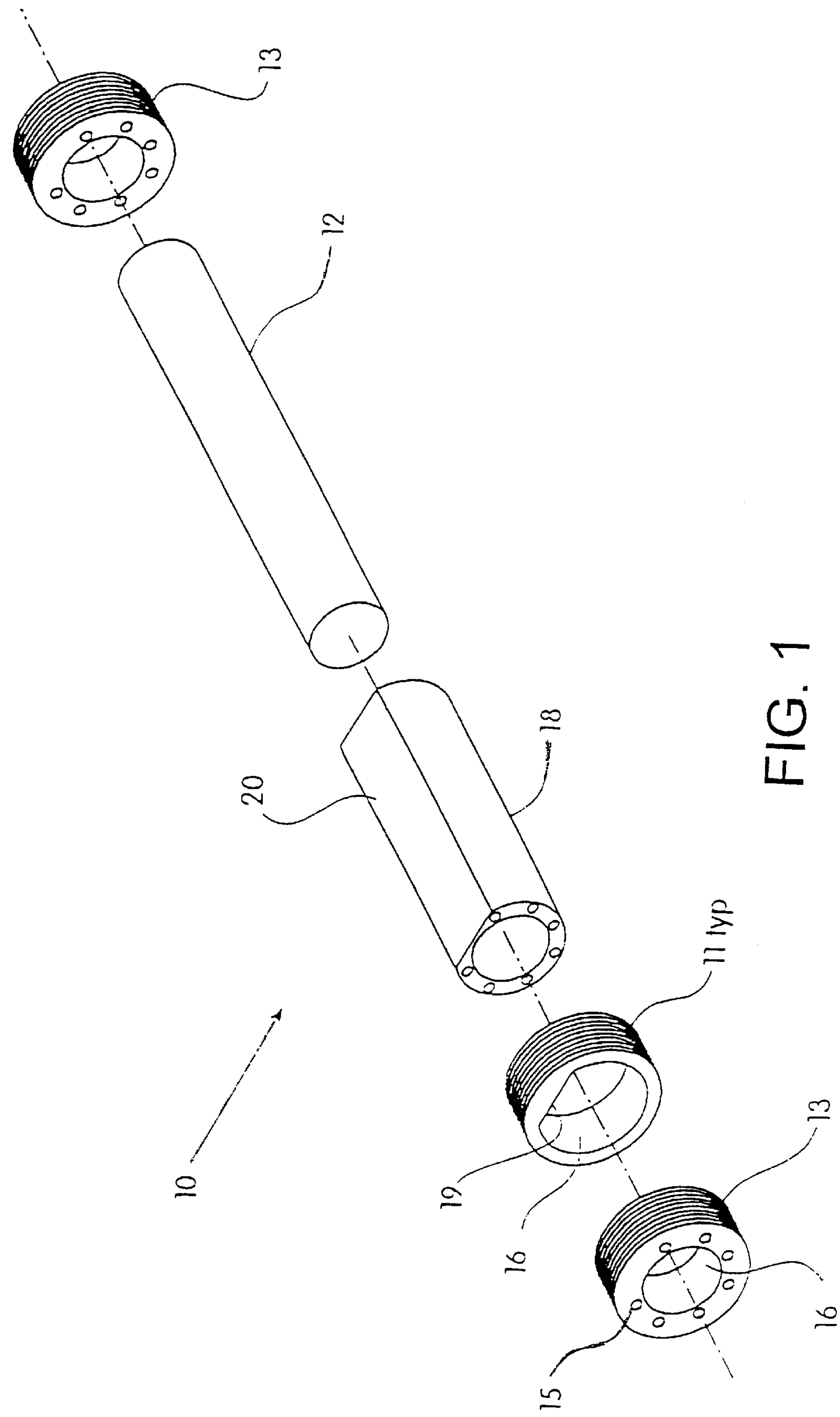
FIG. 1 is an exploded view of a hard-faced roller assembly mounted onto a bearing shaft.
Figure 2:
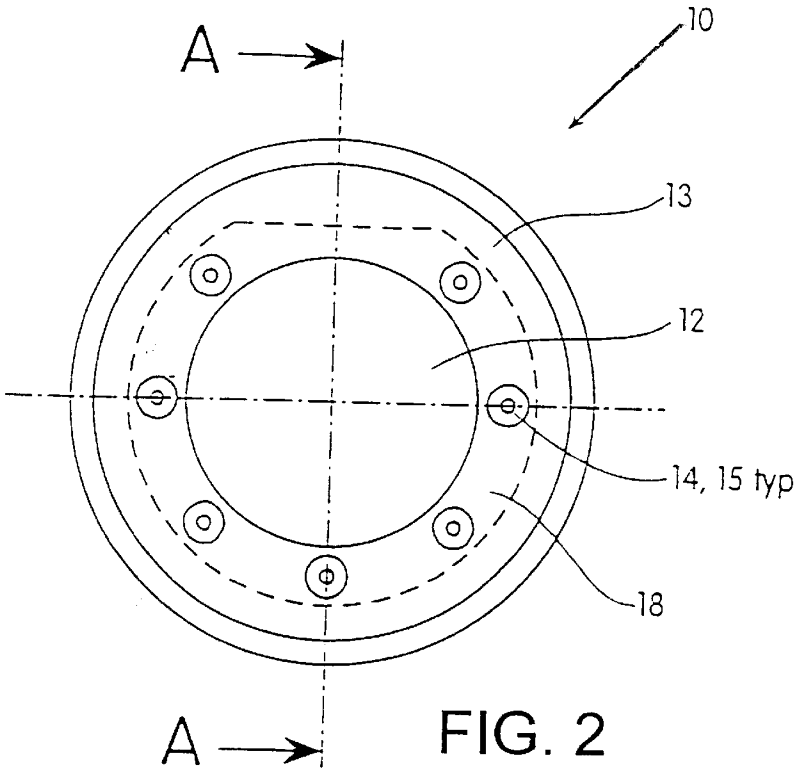
FIG. 2 is an end view of the roller assembly of FIG. 1.
Figure 3:
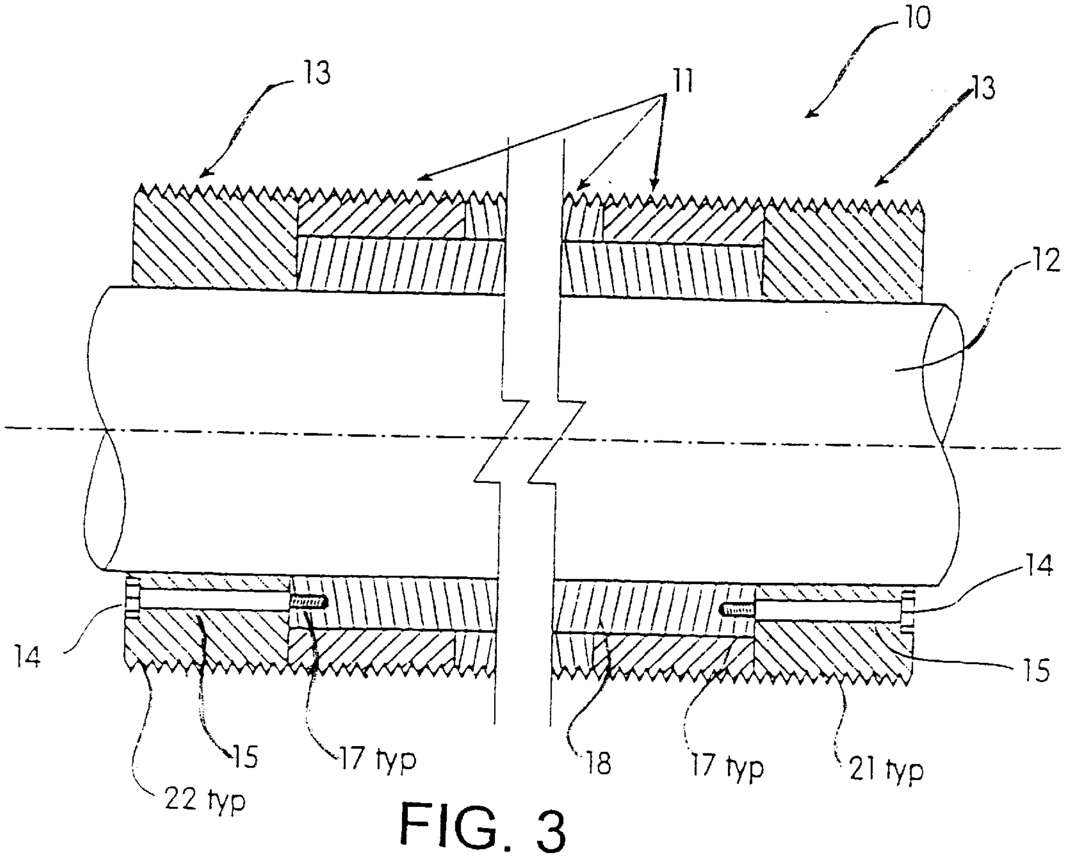
FIG. 3 is a section on A—A of FIG. 2 showing part of the roller assembly.

Referring to FIGS. 1, 2 and 3, a roller assembly 10 includes a plurality of roller shell sections, one of which is shown typically at 11 in FIG. 1, each mounted on a collar 18 which in turn is mounted on a shaft 12. In order to hold the roller shell sections 11 on the shaft 11 and sleeve 18, there are provided two respective end shell sections 13.

Each end shell section 13 and shell section 11 includes seven co-axial apertures shown typically at 15, the location of which are better displayed in FIG. 2, where the respective apertures 15 have respective bolts inserted, as shown typically at 14. Each end of the sleeve 18 includes respective blind apertures shown typically at 17 which are threaded for receipt of the respective bolts 14.

Each shell section 11 and end shell section 13 also includes a central bore 16 through which the shaft 12 is passed. The shell sections 11 include a land 19 which engages with a complementary key 20 on the sleeve 18 to prevent the shell sections 11 rotating on the sleeve 18.

Referring to FIG. 3, each end shell section 13 and shell section 11 includes a plurality of ridges shown typically at 21 and interposed therebetween, a plurality of grooves shown typically at 22 extending circumferentially about their respective outer perimeters.

Figure 4:
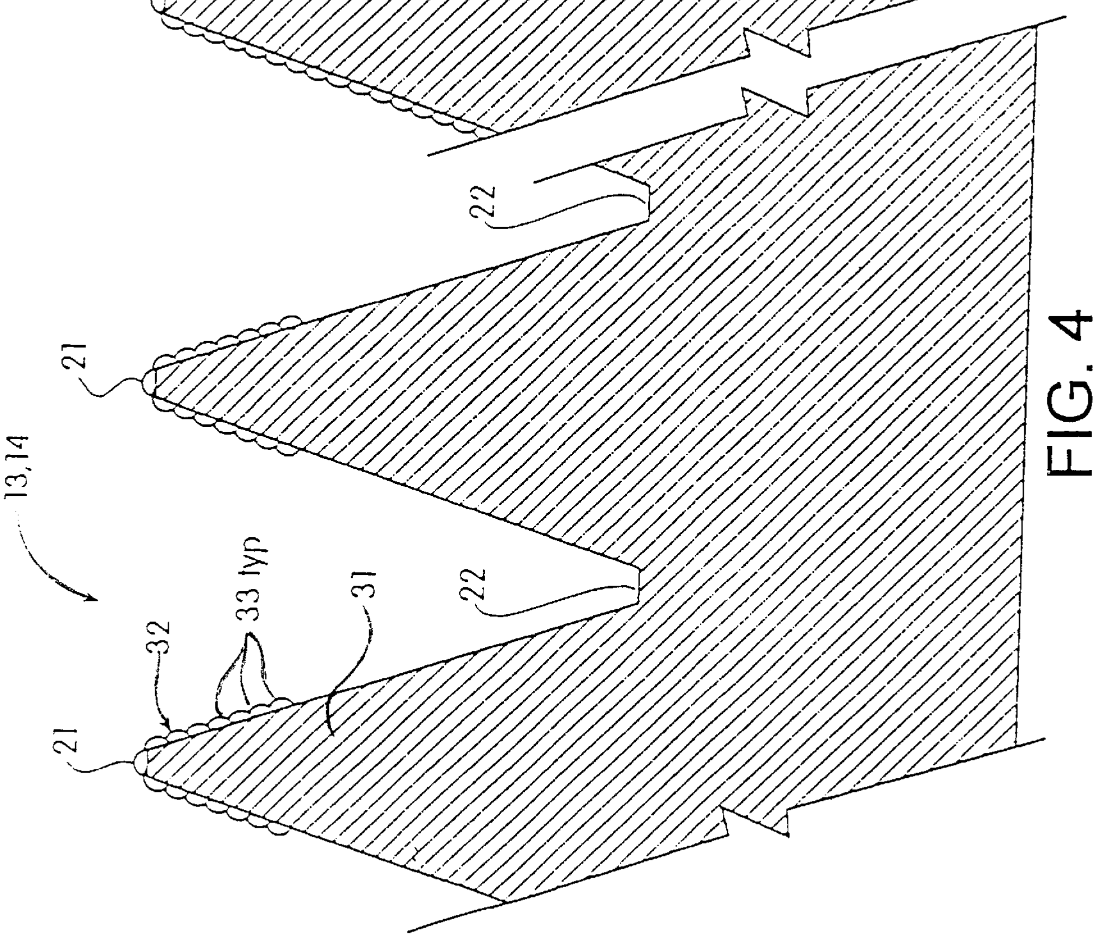
FIG. 4 is a sectional detail view of abrasion resistant material applied to caps of the grooves of the roller of FIGS. 1 to 3.

Referring to FIG. 4, a portion of an end or centre shell section 13 or 14 is shown in sectional view. Each ridge 21 includes a ridge cap portion 31 upon which a plurality of abrasion resistant welds 33 are provided to provide abrasion weld cap 32. In this embodiment, the grooves 22 are not capped with weld material.

Figure 5:
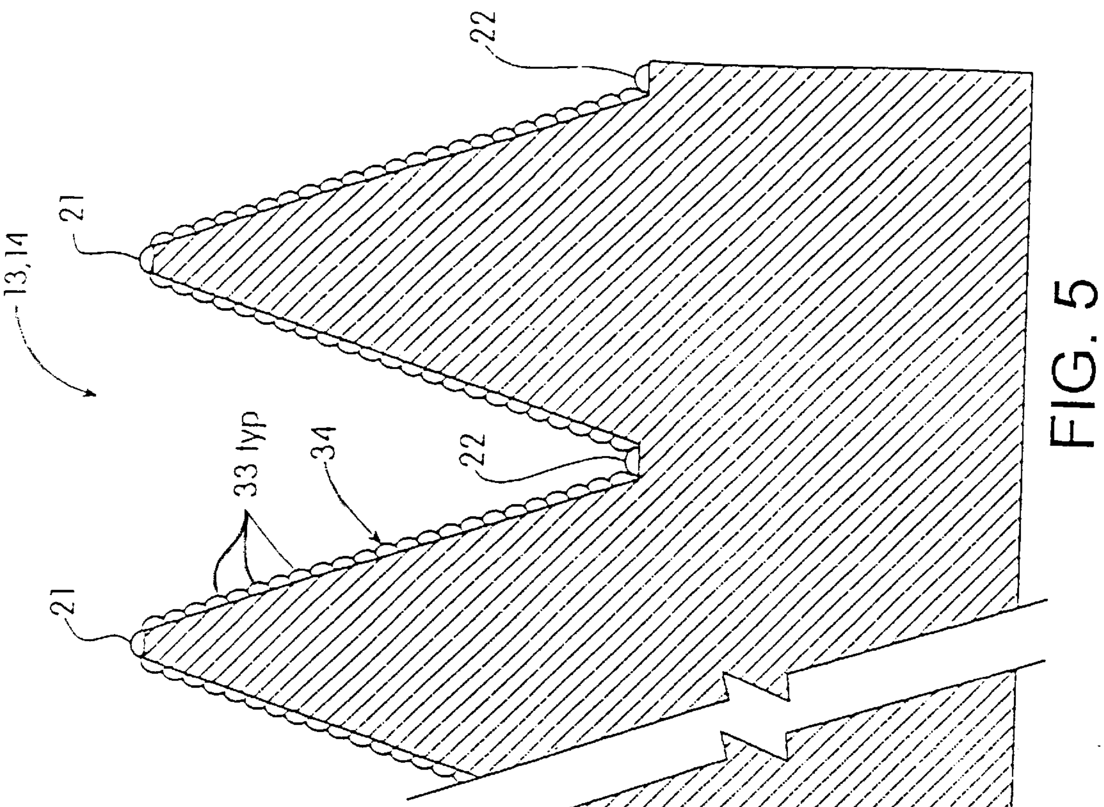
FIG. 5 is a sectional detail view of an alternative application of the abrasion resistant material of FIG. 4.

Referring to FIG. 5, the ridges 21 and grooves 22 are provided with a plurality of abrasion resistant welds 33 in a similar fashion to those provided on the abrasion resistant weld cap 32 shown in FIG. 4. However, the entire surface of the ridges 21 and grooves 22 are provided with the abrasion resistant welds 33 to form an abrasion resistant weld coating 34.

Referring to FIGS. 6 to 9, a ridge profile 23 is of a variety of shapes as shown. In FIGS. 6 to 9, weld material is represented by a triangle and dot fill pattern. The following combinations regarding welding process are fundamental to weld profile creation so that when the molten weld solidifies the final weld shape is of substantially triangular cross-section.

The combination of welding torch angle, pre-machined roller tooth profile, rotational speed of the roller (weld surface speed), raw materials, preheat & specific welding consumables provides the finished profile for a sugar mill roller to be used in an as-welded condition. This is preferably done whilst the roller is rotated with its longitudinal axis in the horizontal plane. The shape shown in FIGS. 4 and 5 are very difficult to form any other way with inert-gas metal-arc (Mig) carbide hardfacing except by elevating the roller from the horizontal and inclining it on its longitudinal axis.

Figure 6:
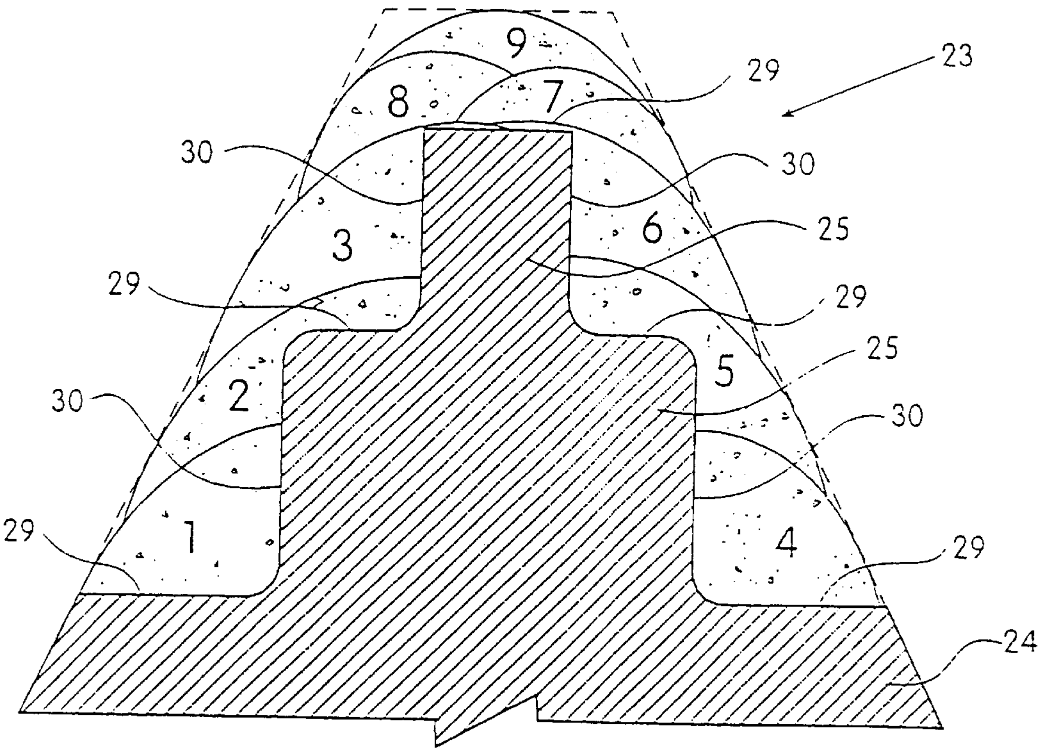
FIGS. 6 to 9 are sectional detail views of alternative preferred embodiments of ridge profiles for application of hardfacing composite.
Figure 7:
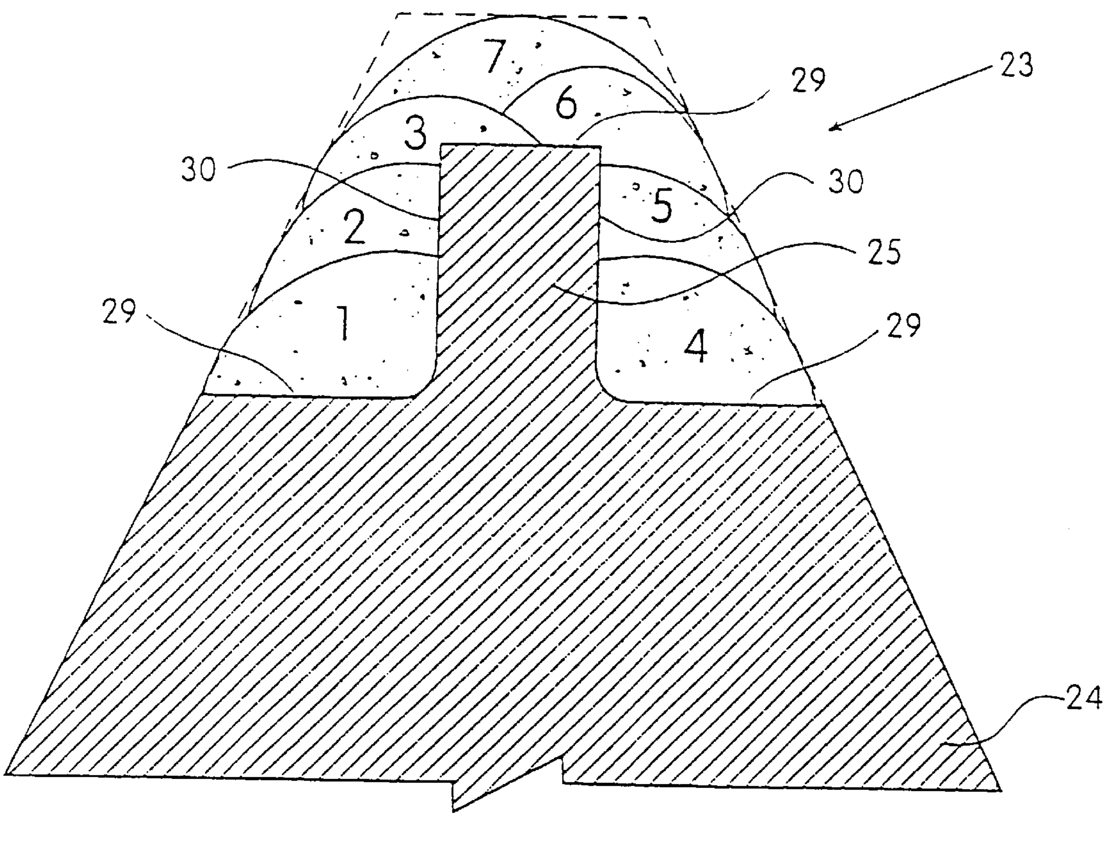

It will be appreciated that the preferred pre-machined shapes may vary from those shown in FIGS. 6 to 9. It is preferred that the ridge profiles 23 be substantially symmetrical, however, it will be appreciated that in some applications, where a non-symmetrical weld profile is required or desired, a non-symmetrical ridge profile may be appropriate. However, the ridge profile 23 includes a base portion 24 and one or more projections 25. The ridge profile 23 shown in FIG. 7 is the preferred option for general applications, however, ridge profile 23 shown in FIG. 6 is preferred for larger pitch rollers. In each case, weld layers 1 to 9 are applied successively as required to the ridge profile 23.

Another way of describing the ridge profile 23 in FIGS. 6 to 9 is as a base portion 24 having one or more stepped or sloped reductions in cross-section.

It is believed that tungsten carbide dispersal throughout the matrix and multiple pass layer weld adhesion both to the roller and to each layer give an advantage to each of the ridge profiles 23 shown in FIGS. 6 to 9.

Figure 8:
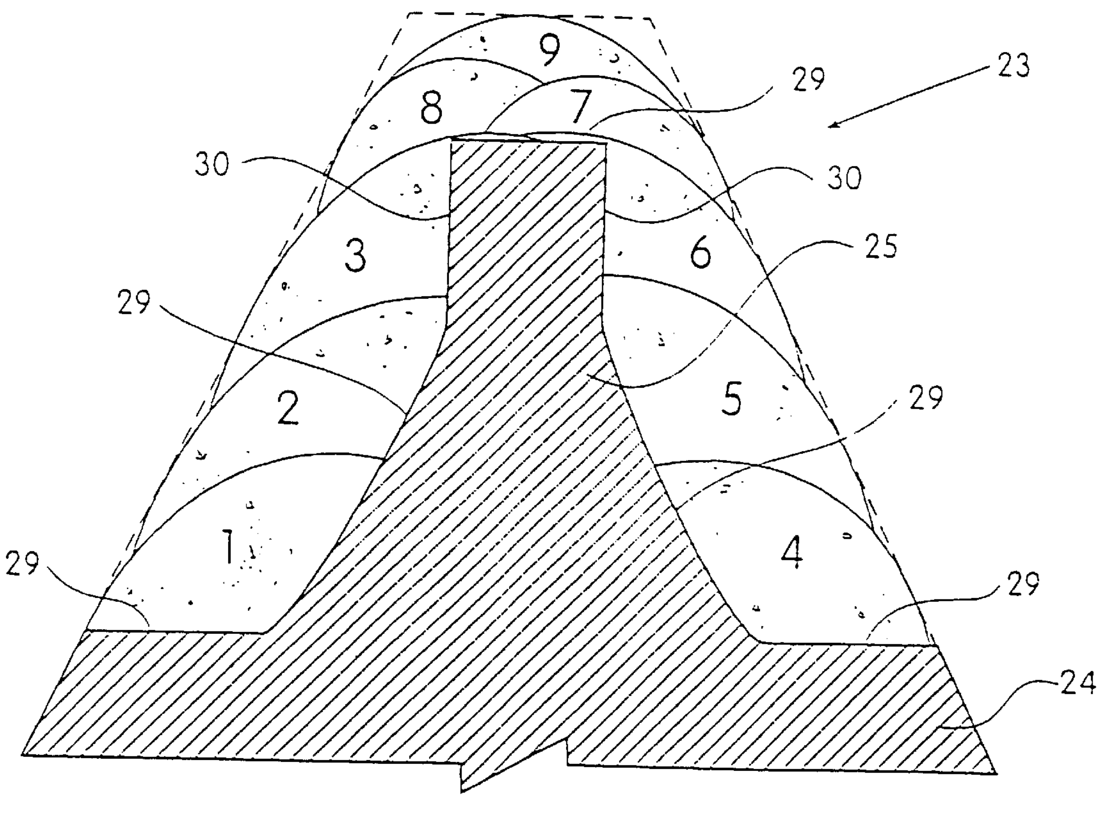
Figure 9:
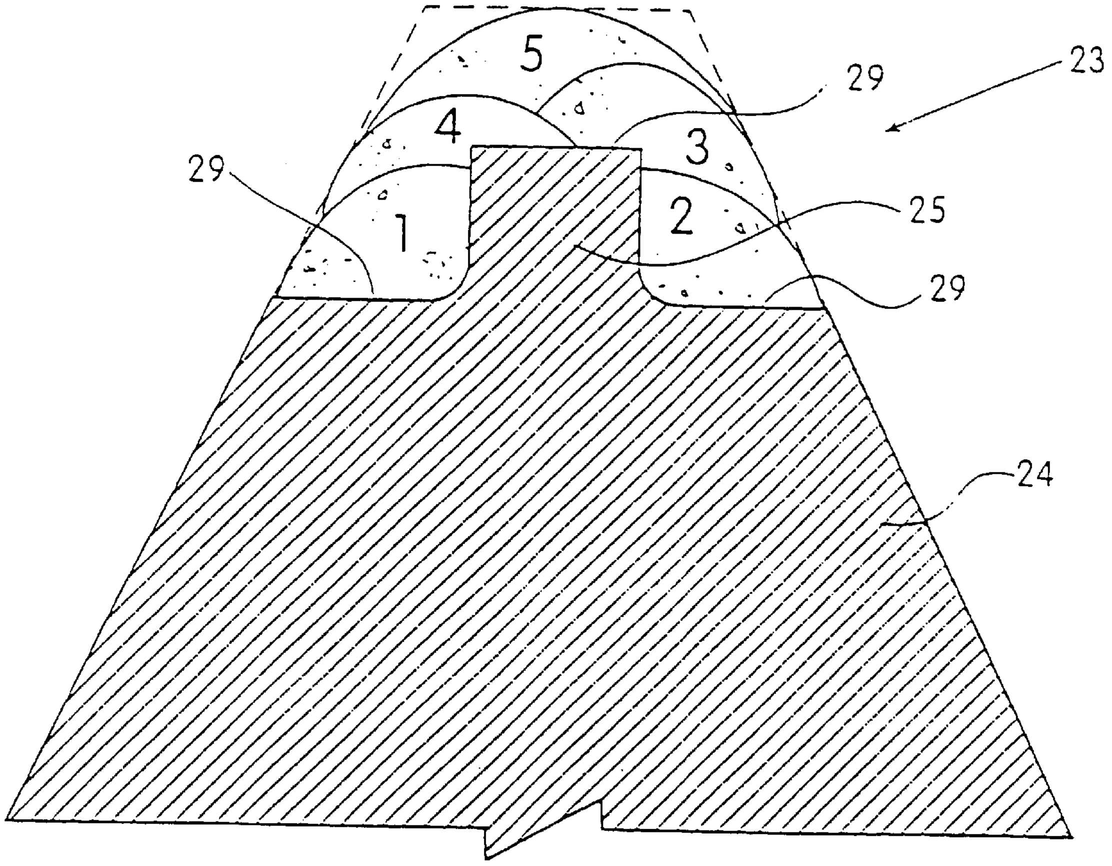

Clearly, the dimensions could be proportioned up in scale to accommodate larger profiles of larger rollers. The larger pitch rollers would also need the same profiles machined in the teeth to achieve similar results. The ridge profile 23 in FIG. 6 is a minimum nine weld pass profile; the ridge profile 23 in FIG. 7 is a minimum seven weld pass profile, and the respective ridge profiles 23 in FIGS. 8 and 9 are for a minimum seven or nine weld pass profile, or a minimum five weld pass profile respectively.

Although the successive beads of weld are generally applied in numerical order as given in FIG. 7, the order may be changed to 1, 4, 2, 5, 3, 6 and then 7. A similar method may be applied to FIG. 8 with successive beads of weld applied on alternate sides of the projection 25.

The ridge profiles 23 described above have been applied to a standard grey cast iron roller, in spite of the expected difficulties in the relatively high carbon content of the cast iron affecting the re-welded profile by diffusion of carbon into the weld.

Figure 10:
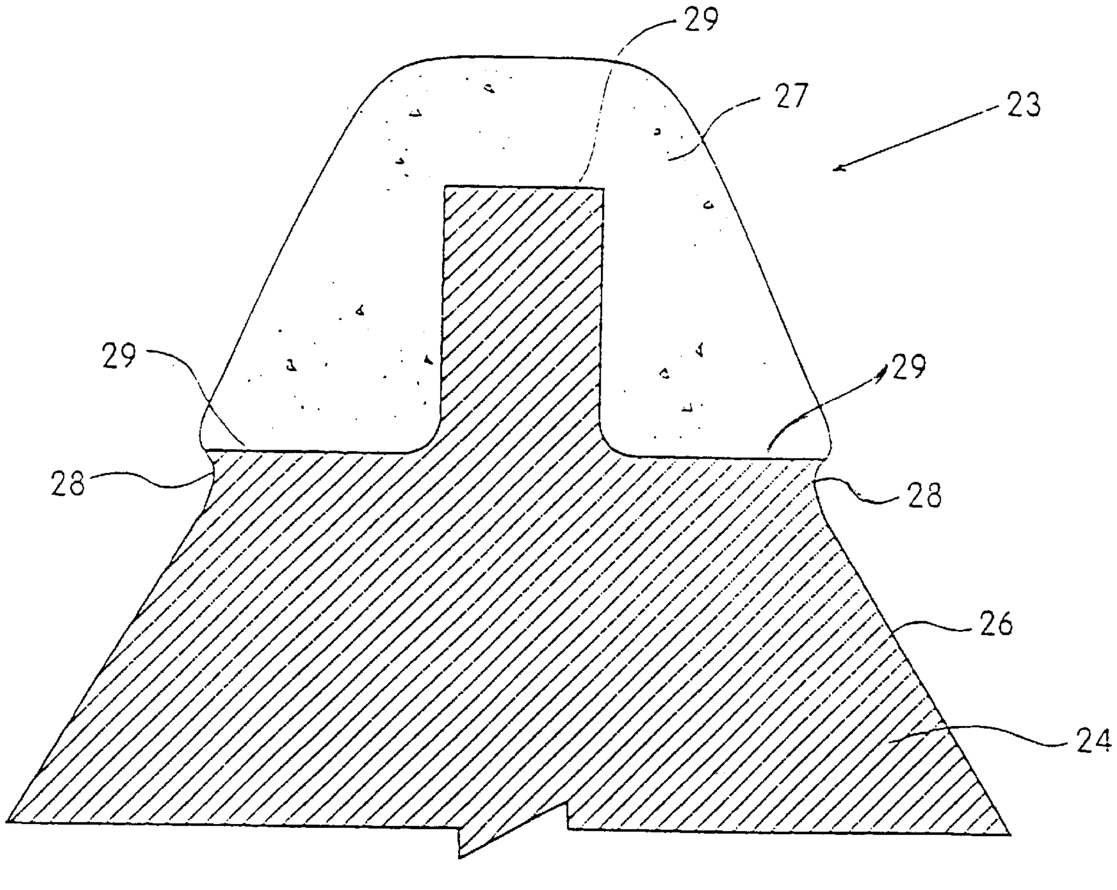
FIG. 10 is a sectional detail view of the ridge wear profile of FIG. 6 after a typical part cycle of use.

Referring to FIG. 10, the ridge profile 23 has worn down to a worn surface shown at 26, with more of the base portion 24 wearing than the cap portion 27. An undercut portion 28 has been found to form in experimental trials of the invention on milling of sugar cane after milling about one million tonnes of cane.

Indeed, it has also been surprisingly found that the wear resistant coating of the present invention increases its grip on the bagasse, since it appears that the substrate in which the carbide is embedded partially wears away from the surface of the cap portion 27, exposing the angular grits of carbide material for gripping the bagasse.

Figure 11:
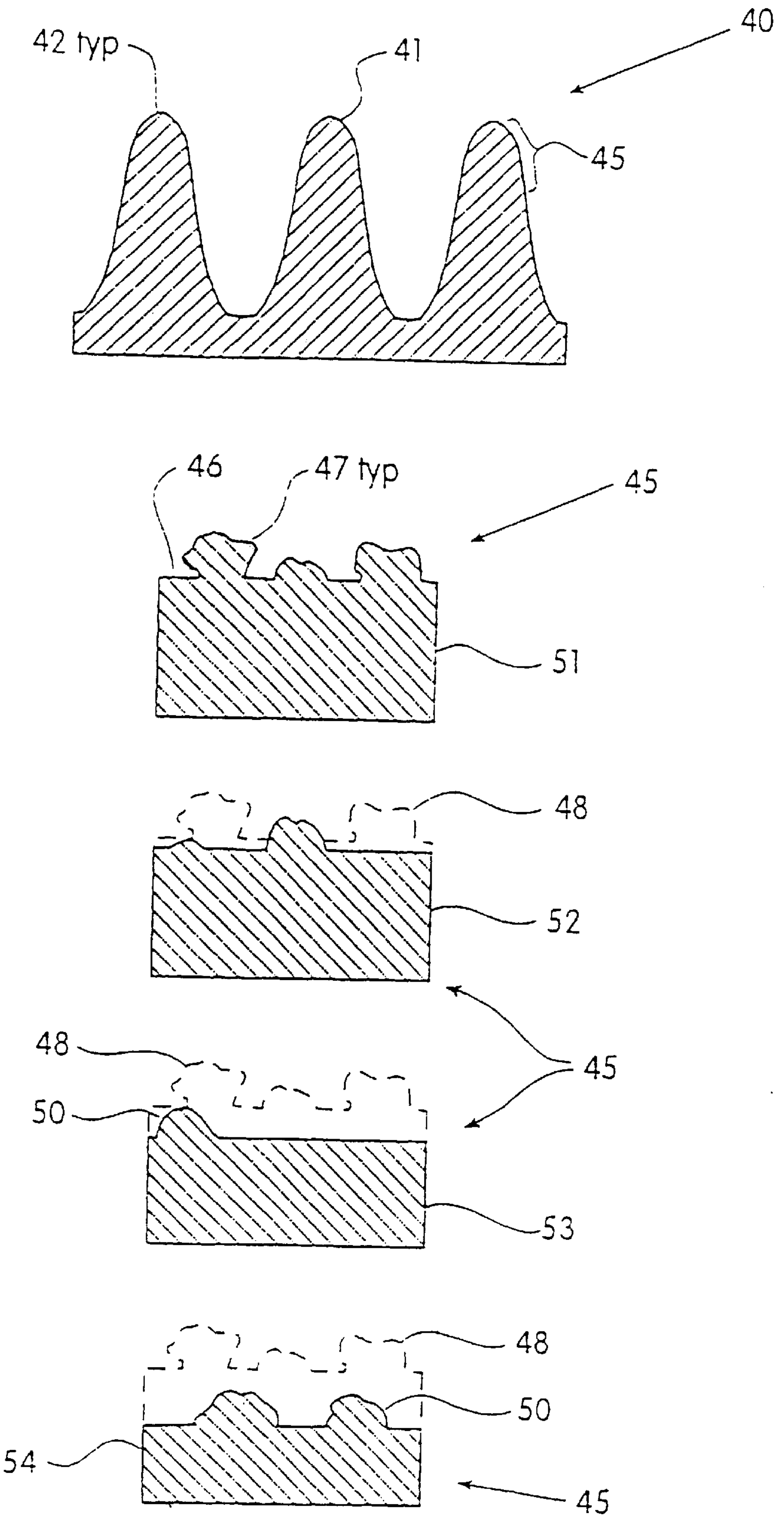
FIG. 11 is a diagrammatic collective representation of self-roughening of the wear profile of FIG. 10.

Accordingly, as shown in FIG. 11, a sugar mill roller portion 40 has a rigge profile shown generally at 41. A hardfacing composition of the present invention is applied to the ridge tops shown typically at 42. A magnified portion 45 is shown in separate views at 51, 52, 53 and 54. Magnified portion includes a surface 46 of mild steel embedded with wear resistant tungsten carbide grits, some of which are exposed and shown typically at 47.

As the surface of the hardfacing wears, some of the grits 47 are broken away from the matrix, the original surface being shown in dotted outline at 48 in views 52, 53 and 54. The surface 46 wears or erodes away to expose new grits as shown at 50 in views 53 and 54.

In order that this invention may be more readily understood and put into practical effect, reference will now be made to an example of the invention having the welding process specifications as follows:

The rotating speed of roller to apply weld layers was in the range of from 21.7 mm to 22.3 mm per second for the butter layer weld and hardfacing layers. The rotating speed of roller to apply final capping weld was 19.35 mm to 20.02 mm per second. The welding torch angle was 18° from the vertical when applied to the uppermost (that is, horizontal) perimeter of the roller. This can also be varied up to 25° to weld the bottom layers in pre-machined ridge profile 23 as shown in FIG. 6.

The current was in a range of from 200 A to 300 A and the voltage from 22 V to 26 V on ARM-1 and 2 wires. These wires are 0.9 mm wires which conform to BS2901 Part 1 1970A18 and AWS A5.18 E70S-6. The preheat temperature of the grey cast iron rollers was 100° C.±5° C. prior to welding. ARM 1 wire is mild steel and ARM 2 wire is 309L stainless steel.

A further technique may be utilised where ARM-2 wire is used as a butter layer without ARM STD 1 tungsten carbide grit in the weld. Then ARM-1 wire with ARM STD 1 tungsten carbide grit is immediately welded onto the first butter layer weld bead and dilution of the first butter layer by the second layer creates a unique matrix and weld metallurgy. This affects weld bead shape and cooling characteristics and appear to affect the solidification (as opposed to melting) of the tungsten carbide in the weld pool. This produces a superior bond to grey cast iron rollers and in particular reduces the problem of longitudinal underbead cracking in the heat affected zone.

In use, the abrasion resistant surface of this invention may be applied to a sugar mill roller. Although it will be appreciated that the hardfacing composite may be applied to a solid roller in accordance with the present invention, instead of replacing the entire sugar mill roller when it wears out, the roller caps may be unbolted from a roller drum and replaced by replacement cylindrical portions. The worn out roller caps may be recycled by separating the hardfacing composites and the substrate according to any known process.

On occasions, one or more shell sections of a roller may wear more than the remainder. In such a case, only the shell sections so worn need be replaced, reducing the cost of maintaining the roller.

It will of course be realised that the above has been given only by way of illustrative example of the invention and that all such modifications and variations thereto as would be apparent to persons skilled in the art are deemed to fall within the broad scope and ambit of the invention as claimed in the following claims.

What is claimed is:

1. A sugar mill roller including:

a roller body of substantially circular cross-section having a plurality of circumferentially running machined ridges formed to be substantially parallel and spaced alone a substantial part of said roller body, each said machined ridge including two or a multiple of two land portions, separated by a wall portion, located on each said machined ridge, and a ridge capping on said two or multiple of two land portions, each said ridge capping including a plurality of layers of weld supporting therein a wear resistant material, wherein one or more of said layers of weld are supported on respective ones of said land portions against said wall portion.

2. A sugar mill roller according to claim 1, wherein said roller body is formed of grey cast iron, and said ridge capping includes a first layer of stainless steel weld.

3. A sugar mill roller according to claim 2, wherein said first layer includes no wear resistant material.

4. A method of applying hardfacing to a sugar mill roller, the method including:

providing a roller body of substantially circular cross-section;

machining a plurality of circumferentially running ridges on said roller body, said ridges being substantially parallel and axially spaced along a substantial part of said roller body, each said ridge including one or more land portions located on each said ridge;

on each said ridge, forming a weld matrix on the one or more land portions by successively applying weld on the previous layer until a ridge capping of desired profile is formed substantially all the way round said roller body, at least some of said layers of weld having particulate wear resistant material supported therein; and machining a wall portion on each said ridge so as to provide one or more land portions on each side of said wall portion, and applying weld against each side of said wall portion in successive layers until the height of said wall portion is substantially reached.

5. A method according to claim 4, and including applying one or more further layers of weld to each respective ridge to substantially encapsulate said wall portion.

6. A method according to claim 1, wherein said weld is applied by metal inert gas (mig) welding or tungsten inert gas (tig) welding, characterized in that the weld pool first applied to the or each said land portion is formed from a stainless steel welding rod without any wear resistant material added thereto and said successive layers are formed from a mild steel welding rod used to form said respective weld pools impinged with a particulate wear resistant material, until a ridge capping of desired profile is formed substantially all the way around each ridge.

7. A sugar mill roller including a roller body formed in accordance with the method of claim 6.

8. The sugar mill roller of claim 1, wherein the wear resistant material is in particulate form.

9. The sugar mill roller of claim 8 where the particulate wear resistant material is tungsten carbide.

* * * * *